US011989404B1

(12) United States Patent
McGinnis et al.

(10) Patent No.: US 11,989,404 B1
(45) Date of Patent: May 21, 2024

(54) TIME-BASED VISUALIZATION OF CONTENT ANCHORED IN TIME

(71) Applicant: Apple Inc., Cupertino, CA (US)

(72) Inventors: Allessandra E. McGinnis, San Francisco, CA (US); Luis R. Deliz Centeno, Oakland, CA (US); Kevin Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/872,612

(22) Filed: Jul. 25, 2022

Related U.S. Application Data

(60) Provisional application No. 63/227,557, filed on Jul. 30, 2021.

(51) Int. Cl.
*G06F 3/04847* (2022.01)
*G06F 3/01* (2006.01)
*G06T 19/00* (2011.01)

(52) U.S. Cl.
CPC .......... *G06F 3/04847* (2013.01); *G06F 3/011* (2013.01); *G06T 19/00* (2013.01); *G06T 2200/24* (2013.01)

(58) Field of Classification Search
CPC ...... G06F 3/04847; G06F 3/011; G06T 19/00; G06T 2200/24
See application file for complete search history.

(56) References Cited

U.S. PATENT DOCUMENTS

| | | | | |
|---|---|---|---|---|
| 2008/0307330 | A1* | 12/2008 | Louch | G06F 3/0483 715/763 |
| 2011/0221657 | A1* | 9/2011 | Haddick | G06Q 30/0261 359/554 |
| 2012/0099804 | A1* | 4/2012 | Aguilera | G06F 16/954 382/285 |
| 2012/0249741 | A1* | 10/2012 | Maciocci | G06T 19/006 348/51 |
| 2013/0332855 | A1* | 12/2013 | Roman | G06F 3/0488 715/753 |
| 2016/0034042 | A1* | 2/2016 | Joo | G02B 27/0172 345/633 |
| 2017/0365102 | A1* | 12/2017 | Huston | A63F 13/65 |

* cited by examiner

*Primary Examiner* — Terrell M Robinson
(74) *Attorney, Agent, or Firm* — Thompson Hine LLP (57) ABSTRACT

Various implementations disclosed herein include devices, systems, and methods that provide extended reality (XR) environments that include virtual content anchored to particular times and/or within physical environments. In some implementations, an XR environment is provided based on virtual content items (e.g., representing memories or past events) that are anchored to both physical locations and particular times along a timeline. This may involve selecting and providing virtual content items (e.g., representing memories) based on user input that selects a particular time, e.g., day, time, date/time range, etc. The content can include real and/or virtual content representing objects and/or people and may be the user's own private memories, memories shared by friends, or selected public memories.

27 Claims, 7 Drawing Sheets

TIME-BASED VISUALIZATION OF CONTENT ANCHORED IN TIME

CROSS-REFERENCE TO RELATED APPLICATIONS

This application claims the benefit of U.S. Provisional Application Ser. No. 63/227,557 filed Jul. 30, 2021, which is incorporated herein in its entirety.

TECHNICAL FIELD

The present disclosure generally relates to electronic devices that use sensors to provide views of 3D environments, including views that include representations of objects of physical environments and/or virtual content.

BACKGROUND

Existing extended reality (XR) systems may be improved with respect to providing more realistic, immersive, multi-sensory, comfortable, and/or adaptive content and environments.

SUMMARY

Various implementations disclosed herein include devices, systems, and methods that provide extended reality (XR) environments that include virtual content anchored to particular times and/or within physical environments. The virtual content may include 2D or 3D visual and/or audio content items. The virtual content may be based on recorded or reconstructed prior historical or fictitious events associated with a particular time. The virtual content may be based on previously occurring environments and/or events and thus may enable experiences in which a past environment or event is observed, e.g., providing a "memory" type of experience. In some implementations, an XR environment is provided based on virtual content items that are anchored to both physical locations and particular times along a timeline. This may involve selecting and providing virtual content (e.g., 3D content items representing memories) based on user input that selects a particular time, e.g., day, time, date/time range, etc. The virtual content can depict or otherwise represent real and/or unreal objects and/or people and may represent the user's own private memories, memories shared by friends, or selected public memories, for example, available via a magazine publisher's app, a news publisher's app, etc.

In some implementations, a processor performs a method by executing instructions stored on a computer readable medium. The method receives input during a presentation of an extended reality (XR) environment, where the input selects a particular time. For example, a user may provide input selecting a particular time, e.g., a particular event's time, a particular minute of a particular day, a particular time/day range, a particular year, etc. In some implementations, a user selects a time using a user interface control made available via the XR environment such as a scrubber tool that enables the user to scrub through a timeline of multiple, time-anchored content items. Such a scrubber tool may enable a user to view the progression of 3D content (virtual/real) added to and changed at a location/room over time. In some implementations, input selects a particular time/location combination based on an auto detection of the current location or input identifying a current or remote location.

The method selects a virtual content item (e.g., a 3D content item) of a plurality of virtual content items) based on the particular time. The plurality of virtual content items are each anchored to a particular physical location and respective times along the timeline and thus can be selected by matching the selected particular time with the times to which one or more of the virtual content items are anchored. For example, each of multiple virtual content items may represent a memory associated with a physical location (e.g., a room, building, park, restaurant, beach, etc.) and a date, time, time period/range, etc. The method may select one or more of these virtual content items associated with that time at all locations, a current location, or a selected location based on the time anchorings of the virtual content items.

The method, in accordance with selecting the virtual content item, displays the selected virtual content item in the XR environment based on a physical location to which the virtual content item is anchored. For example, a virtual object may be anchored to the top of a desk surface in a particular room and anchored to a particular date. Based on this virtual object being selected (e.g., based on the room and date), the XR environment may display the virtual object at a position on top of a depiction of the desk (or a corresponding desk or other object) in the XR environment. The viewing position of the user viewing the XR environment may correspond to a recording position from which the virtual content was created, e.g., in circumstances in which a user is viewing an XR environment that corresponds to a remote environment. Alternatively, the viewing position of the user viewing the XR environment may correspond to the user's current position, for example, while viewing virtual content anchored within the user's current environment. In some implementations, multiple virtual content items (e.g., associated with different memory representations) associated with the same or different times may be simultaneously viewed. For example, the user may be enabled to experience two weddings that were previously captured in a setting at different times—where the user is enabled to view content from the weddings at the same time in the same venue.

Various other implementations disclosed herein include devices, systems, and methods that provide an XR environment based on virtual content items (e.g., 3D content items representing memories) that are anchored to both physical locations and particular times along a timeline. In some implementations, this involves providing representations (e.g., bubbles) representing available virtual content items (e.g., memory representations) which a user can interact with to select amongst multiple available representations to experience particular, selected, time-anchored virtual content items. In some implementations, a processor performs a method by executing instructions stored on a computer readable medium. The method selects a subset of a plurality of virtual content items, where the plurality of virtual content items are anchored to physical locations and times along a timeline and the subset is selected based on a physical location to which the virtual content items of the subset are anchored. For example, this may involve identifying all of the memory representations anchored in the user's current physical environment or anchored to a selected room or other selected physical environment. The method presents representations (e.g., bubbles) of the subset of the plurality of virtual content items in an extended reality (XR) environment. The method receives input during presentation of the XR environment, the input selecting a first representation of the representations, where the first representation corresponds to a first virtual content item of the plurality of virtual content items. For example, the input may be a user pointing to a bubble, turning or moving towards a bubble, providing an audible selection, etc. In accordance with receiving the input, the method displays the first virtual content item in the XR environment based on a physical location to which the virtual content item is anchored.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
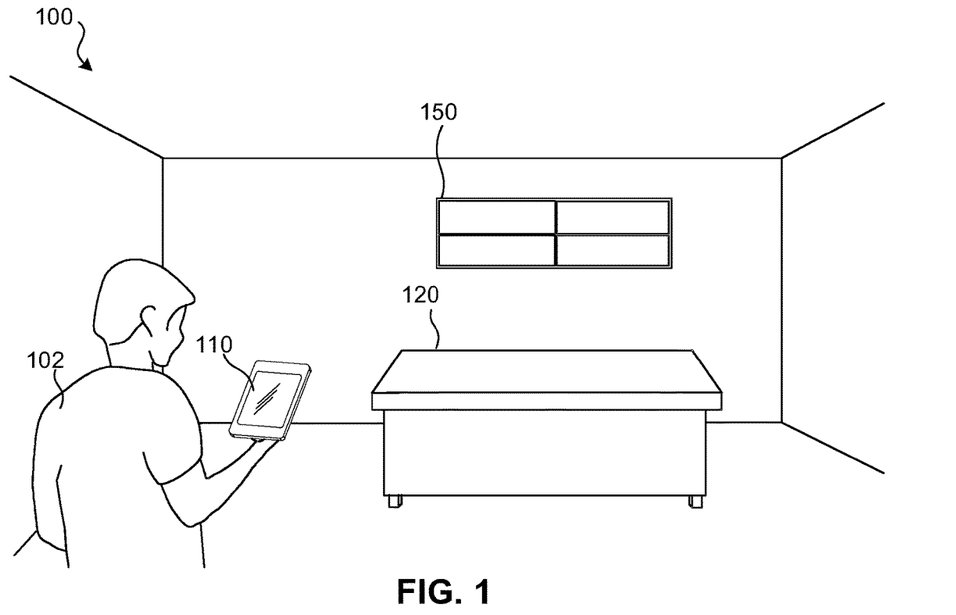
FIG. 1 illustrates exemplary an electronic device operating in a physical environment in accordance with some implementations.

FIG. 1 illustrates an exemplary electronic device 110 operating in a physical environment 100. In this example of FIG. 1, the physical environment 100 is a room that includes a desk 120 and a window 150. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content.

A physical environment refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
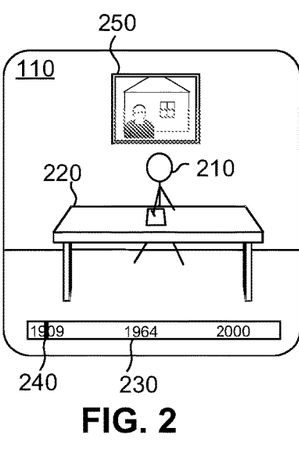
FIG. 2 illustrates a view of an XR environment provided by the device of FIG. 1 including virtual content selected based on user input that selects a particular time in accordance with some implementations.

FIG. 2 illustrates a view of an XR environment provided by the device 110 of FIG. 1 including virtual content selected based on user input that selects a particular time. In this example, the view of the XR environment includes a scrubber feature that includes a representation of a timeline 230 and an indicator 240 that can be positioned based on user input at a position along the representation of the timeline 230 to select a particular time. For example, as illustrated in FIG. 2, the indicator 240 is positioned along the representation of the timeline 230 at a position corresponding to a time, i.e., the year 1909. Based on this particular time (e.g., the year 1909 in this example), virtual content anchored to that date is presented within the view of the XR environment.

In FIG. 2, the view of the XR environment includes virtual content that is selected based on the particular time (e.g., the year 1909 in this example) and the location (e.g., the physical environment 100). Virtual content anchored to both that particular time and that location is selected and displayed. In this example, the desk 120 and window 150 of the current time physical environment 100 (as shown in FIG. 1) were not part of the physical environment 100 at the prior time. Instead, the physical environment during that prior time (i.e., 1909) included a picture hanging on a wall and a different desk. The virtual content includes a representation 250 of this previously-hanging picture and a representation 220 of this previously present desk. This virtual content (i.e., representations 250, 220) is positioned in the respective positions within the XR environment based on the corresponding positions of these objects during the prior time (i.e., in 1909).

In some implementations, aspects of the view are provided using pass-through video or otherwise based on live-sensor data, e.g., depicting portions of a physical environment that have not changed since the prior time that is being presented. Aspects of the environment that have changed are represented using virtual content, e.g., using virtual content to represent the portion of the wall that was there before the window was added and virtual content to represent the picture. In other words, aspects of the physical environment 100 that were once present at the prior time but that are no longer present can be added using virtual content and aspects of the physical environment 100 that are currently present but were not previously present at the prior time may be erased using virtual content. The resulting appearance may thus represent the prior appearance of the physical environment 100 at the selected prior time rather than the current appearance of the physical environment 100.

In the example of FIG. 2, the virtual content also includes a representation 210 of a person signing a first legislative bill on the representation 220 of the desk that was in the room at the time of the signing. Such content may be generated based on sensor data obtained during the actual signing of the event or generated via a content generation process after the actual signing. In some implementations, the virtual content is generated by creating a 3D model using sensor data obtained during the actual signing event (e.g., images, etc.). In some implementations, the virtual content includes moving content, e.g., showing the representation 210 of the person signing (e.g., hand moving, pen moving, talking, etc.). Moving content may be generated based on sensor data obtained over time during the signing event, e.g., generating a 3D model (e.g., point cloud or mesh) for each of multiple instants in time during an event/time period. The virtual content may thus include 3D time recorded content and/or 3D animated/generated content.

In this example of FIG. 2, the physical environment 100 is a government office of an elected official that the user 102 has visited. While visiting, the user 102 initiates an XR experience on the device 110, selects the particular time (i.e., the year 1909), and views a 3D experience of virtual content within that government office. As illustrated, the user 102 sees the signing of an significant legislative bill back in 1909 within a view that is representative of how the government office looked back in 1909. Such 3D virtual content used to provide such an experience may have been generated from a live recording of that signing or generated after the fact, e.g., using actors reenacting the scene or computer-generated based on knowledge and information about the event and the aspects of the physical environment (e.g., type of desk, wall hangings, the appearance of the person signing, etc.).

The XR experience viewed as illustrated in FIG. 2 may include virtual content that is static or moving and/or may be interactive. For example, the user may be enabled to walk around and view the signing from different angles, to look at the representation 250 of the picture up close, to pick up and read the document that is signed, etc.

Figure 3:
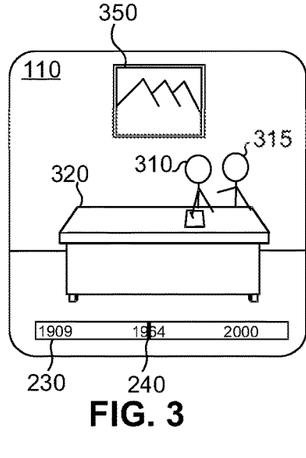
FIG. 3 illustrates a view of the XR environment provided by the device of FIG. 1 including virtual content selected based on user input that selects another particular time in accordance with some implementations.

During the XR experience, the user may interact with the scrubber feature to select a different time. For example, as illustrated in FIG. 3, the indicator 240 has been repositioned along the representation of the timeline 230 at a position corresponding to a time in 1964. Based on this particular time (e.g., the year 1964 in this example), virtual content anchored to that date is presented within the view of the XR environment.

In FIG. 3, the view of the XR environment includes virtual content that is selected based on the particular time (e.g., the year 1964) and the location (e.g., the physical environment 100). Virtual content anchored to both that particular time and location is selected and displayed. In this example, the desk 120 was part of the physical environment 100 but the window 150 was not part of the physical environment 100 at the prior time. Instead, the physical environment during that prior time (i.e., 1964) included a picture hanging on a wall. Pass through video or other representation of the desk 120 may be used to provide representation of the desk 120. However, since the window has replaced by the picture, the virtual content includes a representation 350 of the picture (and surrounding wall if necessary). This virtual content (i.e., representation 350) is positioned based on its corresponding position during the prior time (i.e., in 1964). As with FIG. 2, the virtual content erases the window and replaces it with virtual content representing the wall and the representation 350 of the picture.

In the example of FIG. 3, the virtual content also includes a representation 310 of a person (different that the representation 210 of the person from 1909) signing a second legislative bill on the representation 320 of the desk 120 that was in the room at the time of the signing (and still in the room currently). A representation 315 of another person watching the signing is also included. As with FIG. 2, in some implementations, the virtual content includes moving content, e.g., showing the representation 310 of the person signing and/or showing the representation 315 of the other person clapping, etc. The virtual content may include 3D time recorded content and/or 3D animated/generated content.

In FIG. 3, while visiting the physical environment 100 and during an XR experience on the device 110, the user 102 selects another particular time (i.e., selecting the year 1964 after having viewed content associated with the year 1909), and views another 3D experience of virtual content within the same (although somewhat changed) government office. As illustrated, the user 102 sees the signing of another legislative bill back in 1964 within a view that is representative of how the government office looked back in 1964. Such 3D virtual content used to provide such an experience may have been generated from a live recording of that signing or generated after the fact, e.g., using actors reenacting the scene or computer-generated based on knowledge and information about the event and the aspects of the physical environment (e.g., type of desk, wall hangings, the appearance of the person signing, etc.).

The XR experience viewed as illustrated in FIG. 3 may include virtual content that is static or moving and/or may be interactive. For example, the user may be enabled to walk around and view the signing from different angles, to look at the representation 350 of the picture up close, to pick up and read the document that is signed, etc.

Figure 4:
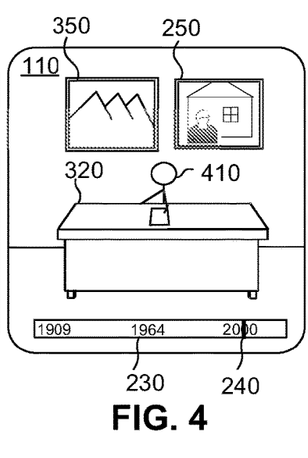
FIG. 4 illustrates a view of the XR environment provided by the device of FIG. 1 including virtual content selected based on user input that selects another particular time in accordance with some implementations.

During the XR experience, the user may again interact with the scrubber feature to select a different time. For example, as illustrated in FIG. 4, the indicator 240 has been repositioned along the representation of the timeline 230 at a position corresponding to a time, i.e., the year 2000. Based on this particular time (e.g., the year 2000), virtual content anchored to that date is presented within the view of the XR environment.

In FIG. 4, the view of the XR environment includes virtual content that is selected based on the particular time (e.g., the year 2000) and the location (e.g., the physical environment 100). Virtual content anchored to both that particular time and location is selected and displayed. In this example, the desk 120 was part of the physical environment 100 at the prior time but the window 150 was not part of the physical environment 100 at the prior time. Instead, the physical environment during that prior time (i.e., 2000) included two pictures hanging on a wall. Pass through video or other representation of the desk 120 may be used to provide representation of the desk 120. However, since the window has replaced by the pictures, the virtual content includes representations 250, 350 of the pictures. This virtual content (i.e., representations 250, 350) is positioned based on the corresponding positions of the pictures during the prior time (i.e., in 2000). As with FIG. 2, the virtual content erases the window and replaces it with virtual content representing the wall and the representations 250, 350 of the pictures.

In the example of FIG. 4, the virtual content also includes a representation 410 of a person (different that the representations 210, 310 of the persons from 1909 and 1964) signing a third legislative bill on the representation 320 of the desk 120 that was in the room at the time of the signing (and still in the room currently). As with FIGS. 2 and 3, in some implementations, the virtual content includes moving content, e.g., showing the representation 410 of the person signing, etc. The virtual content may include 3D time recorded content and/or 3D animated/generated content.

In FIG. 4, while visiting the physical environment 100 and during an XR experience on the device 110, the user 102 selects a third particular time (i.e., selecting the year 2000 after having viewed content associated with the years 1909 and 1964), and views a third 3D experience of virtual content within the same (although somewhat changed) government office. As illustrated, the user 102 sees the signing of another important legislative bill back in the year 2000 within a view that is representative of how the government office looked back in the year 2000. Such 3D virtual content used to provide such an experience may have been generated from a live recording of that signing or generated after the fact, e.g., using actors reenacting the scene or computer-generated based on knowledge and information about the event and the aspects of the physical environment (e.g., type of desk, wall hangings, the appearance of the person signing, etc.).

The XR experience viewed as illustrated in FIG. 4 may include virtual content that is static or moving and/or may be interactive. For example, the user may be enabled to walk around and view the signing from different angles, to look at the representations 250, 350 of the pictures up close, to pick up and read the document that is signed, etc.

FIGS. 1-4 illustrate virtual content that corresponds to physical aspects of a physical environment as those aspects change over time. Virtual content is used to present previous versions of a physical environment and/or events that occurred at particular prior times. In other implementations, the virtual content depicts virtual content that is anchored within a physical environment for XR experiences. For example, a persistent XR world (which may be based in part on the real world) may be provided in which virtual art, furniture, and other objects are included in the environment. For example, the pictures represented by representations 250, 350 in the examples of FIGS. 1-4 may be virtual objects that do not represent real physical objects present in the physical environments at the prior times but rather may be virtual objects added to a persistent XR world and associated with time periods that include those prior times. Such virtual objects may be anchored to particular locations (e.g., on walls, particular real-world objects, at particular positions within a room, etc.). In other words, the virtual content that is provided to represent a prior state of an XR environment may represent real objects, virtual objects, or any combination of real and virtual objects.

While the examples of FIGS. 1-4 illustrate virtual content having 3D visual content items, it should be appreciated that the virtual content can additionally or alternatively include 2D or 3D visual and/or audio content items. For example, the virtual content of FIGS. 2-3 can include audio containing speech of the people represented by representations 210, 310, 315, or 410 that may be spatialized to sound as if originating from the corresponding representation(s).

Figure 5:
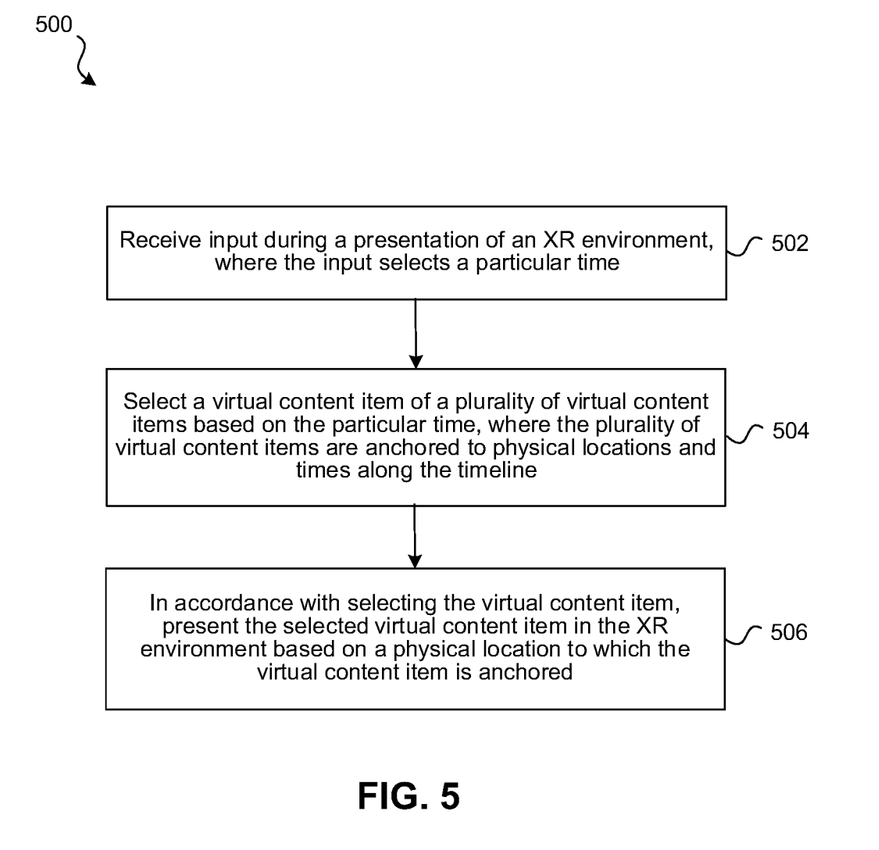
FIG. 5 is a flowchart illustrating a method for providing an XR environment that includes virtual content selected based on user input that selects a particular time in accordance with some implementations.

FIG. 5 is a flowchart illustrating a method 500 for method for providing an XR environment that includes virtual content selected based on user input that selects a particular time. In some implementations, a device such as electronic device 110 performs method 500. In some implementations, method 500 is performed on a mobile device, desktop, laptop, HMD, ear-mounted device or server device. The method 500 is performed by processing logic, including hardware, firmware, software, or a combination thereof. In some implementations, the method 500 is performed on a processor executing code stored in a non-transitory computer-readable medium (e.g., a memory).

At block 502, the method 500 receives input during a presentation of an extended reality (XR) environment, where the input selects a particular time. For example, the input may select a particular time via a scrubber features as illustrated in FIGS. 2-4. In another example, time is selected via a gesture or voice command. In one example, an initial virtual content item (e.g., associated with a first time) is selected and the user provided input indicating to skip to the next virtual content item (e.g., associated with a next time along a timeline with which content is associated). The particular time may correspond to a particular instant in time (e.g., second, minute, day, week, month, year) or a time range or period, e.g., any time during the day of Jun. 15, 1976, any time during the year 1909, etc.

In some implementations, a location is selected automatically. For example, based on the location of the current physical environment, a location is automatically selected. Location may be identified based on sensor data. For example, GPS, Bluetooth, and/or other sensors may provide information from which the physical environment that electronic device 110 is within can be determined. In some implementations, a location is identified additionally and/or alternatively based in computer vision analysis of image data, using a simultaneous localization and mapping (SLAM) technique, and/or using a technique that matches a 3D model of a current environment generated based on image data with one or more 3D models of known physical environments.

In another example, the location used to identify anchored virtual content items differs from the current physical environment. Input may be received, e.g., a voice command to "take me to the signing of the first legislative bill in the oval office" is received and used to identify a time and/or location. In this example, the "oval office" may be used to identify the location of a particular governmental office and the phrase "signing of the first legislative bill in the oval office" may be used to identify a particular time, e.g., the year 1909. Using such input, an XR experience may provide a view that is based at least in part on a physical environment that is separate (and potentially remote from), the current physical environment of the electronic device 110.

At block 504, the method 500 selects a virtual content item of a plurality of virtual content items based on the particular time, where the plurality of virtual content items are anchored to physical locations and times along the timeline. The virtual content items may include virtual objects that have 3D shapes (e.g., point clouds, meshes, etc.) and/or image and depth information from which a 3D appearance can be provided, 2D image information, spatial or non-spatial audio, or any combination thereof. The content items may be associated with a particular event or occurrence such as a sporting event, party, celebration, social occasion, historical event, segment of time, instant in time, etc. The content items are anchored by being associated with a particular time (e.g., instant in time, time period, time range, etc.) and/or by being associated with a physical location (e.g., a room, building, outdoor venue, etc.). The method 500 may select one or more virtual content items associated with that time at all locations, a current location, or a selected location based on the time anchorings of the virtual content items. Thus, in one example, the method 500 may involve selecting the virtual content item based on determining that a current physical environment of the device matches a physical location to which the virtual content item is anchored.

The timeline may be a private timeline (e.g., of anchored content from one or more specific users) or a public timeline (e.g., of anchored content from a larger set of users). A timeline may be associated with filters that enable a user to include or otherwise view, select from, or otherwise use content from only certain persons or other sources. In one example, a user is able to select a particular publisher or other timeline source to view a particular set of experiences, e.g., from a news app provider or a magazine app provider.

At block 506, in accordance with selecting the virtual content item, the method 500 presents the selected virtual content item in the XR environment based on a physical location to which the virtual content item is anchored. For example, a virtual object may be anchored to the top of a desk surface in a particular room and to a date. Based on this virtual object being selected (based on the room and date), the XR environment may present the virtual object at a position on top of a depiction of the desk (or a corresponding desk or other object) in the XR environment.

The viewing position of the user viewing the XR environment may correspond to a recording position from which the virtual content was created, e.g., in circumstances in which a user is viewing an XR environment that corresponds to a remote environment. For example, the virtual content item may have been created based on images captured from a first viewing position and the XR environment may provide a view of the virtual content item from the same viewing position, e.g., without regard to the user's position, movements, etc.

Alternatively, the viewing position of the user viewing the XR environment may correspond to the user's current position, for example, while viewing virtual content anchored within the user's current environment. For example, the virtual content item may have been created based on images captured from a first viewing position and the XR environment may provide a view of the virtual content item from a second viewing position different than the first viewing position, e.g., based on the user's position, movements, etc.

In some implementations, multiple virtual content items (e.g., associated with different memory representations) associated with the same or different times may be simultaneously viewed. For example, the user may be enabled to experience two weddings that were previously captured in a setting at different times—where the user is enabled to view content from the weddings at the same time in the same venue. In some implementations, user interface features facilitate a desirable experience for experiencing such multiple content items at the same time or in succession. For example, constructs such as "lenses" providing visual representations of different virtual content items can be accessible and interacted with for a user to select one or more of multiple potential virtual content items to view at a given time. In another example, virtual content items may be prioritized according to system criteria and/or user criteria, e.g., playing items from oldest to newest or items flagged by the user as favorites with higher priority.

In some implementations, the method 500 receives input selecting a plurality of sequential times and, in accordance with the input, sequentially presenting virtual content items anchored to the plurality of sequential times. For example, a user may use a tool such as a scrubber feature to move sequentially through and experience multiple different virtual content items associated with multiple different times.

Figure 6:
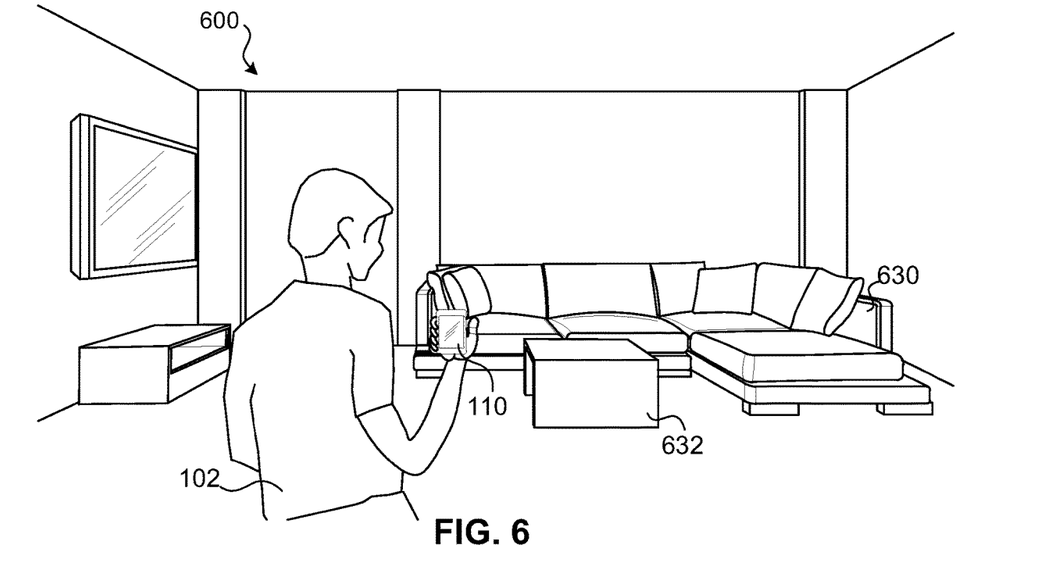
FIG. 6 illustrates exemplary an electronic device operating in a physical environment in accordance with some implementations.

FIG. 6 illustrates exemplary electronic device 110 operating in a physical environment 600. In this example of FIG. 6, the physical environment 600 is a room that includes a sofa 630 and a table 632. The electronic device 110 includes one or more cameras, microphones, depth sensors, or other sensors that can be used to capture information about and evaluate the physical environment 600 and the objects within it, as well as information about the user 102 of the electronic device 110. The information about the physical environment 600 and/or user 102 may be used to provide visual and audio content. For example, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content.

Figure 7:
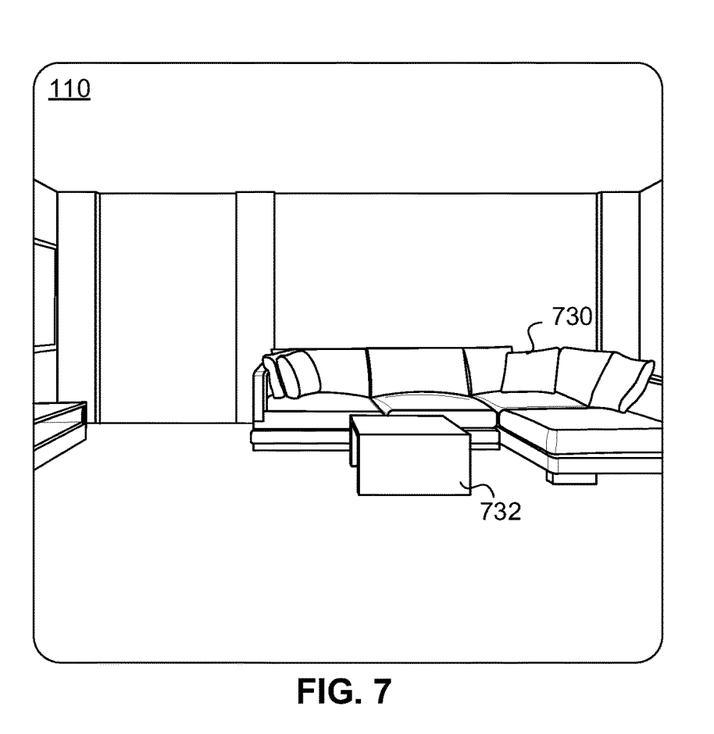
FIG. 7 illustrates a view provided by the device of FIG. 1 based on the physical environment in accordance with some implementations.
Figure 8:
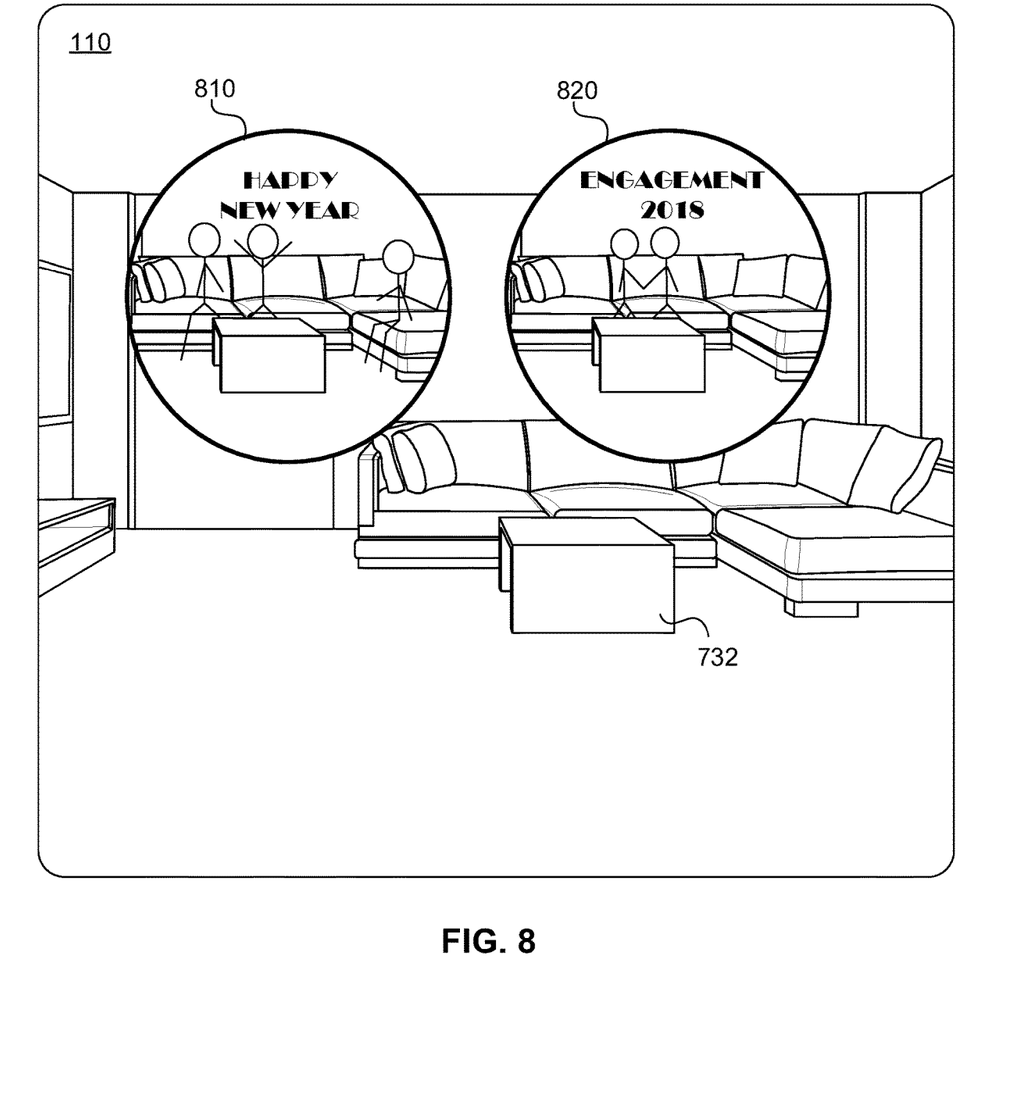
FIG. 8 illustrates the view of FIG. 7 with representations of available time-anchored virtual content items that a user can interact with to select and view a particular content item in accordance with some implementations.

FIG. 7 illustrates a view provided by the device of FIG. 6 based on the physical environment 600. The view includes a depiction 730 of the sofa 630 and a depiction 732 of the table 632. FIG. 8 illustrates the view of FIG. 7 with representations 810, 820 representing available time-anchored virtual content items that a user can interact with to select and view a particular content item in accordance with some implementations. While two representations 810, 820 are illustrated in FIG. 8, it will be recognized that any number of representations may be included. In some examples, if the number of applicable representations exceeds a threshold number a subset of the representations are presented and the user interface enables access to the additional representations, e.g., via swiping through a carousel, scrolling, etc. The multiple representations may be presented in an order, e.g., chronologically based on the times to which the virtual content represented by each representation is anchored. The representations may provide portal-type views into 3D content and/or to moving content to enable the viewer to better recognize and/or comprehend the nature of the represented virtual content items. In the example of FIG. 8, representation 810 corresponds to virtual content of a new year experience anchored to the physical environment 600 and a particular time, e.g., New Year's eve 2015 11:58-12:02 New Year's day 2016. Representation 820 corresponds to virtual content of a marriage proposal anchored to the physical environment 600 and a particular time, e.g., Dec. 20, 2015 9:06-9:30 pm.

Figure 9:
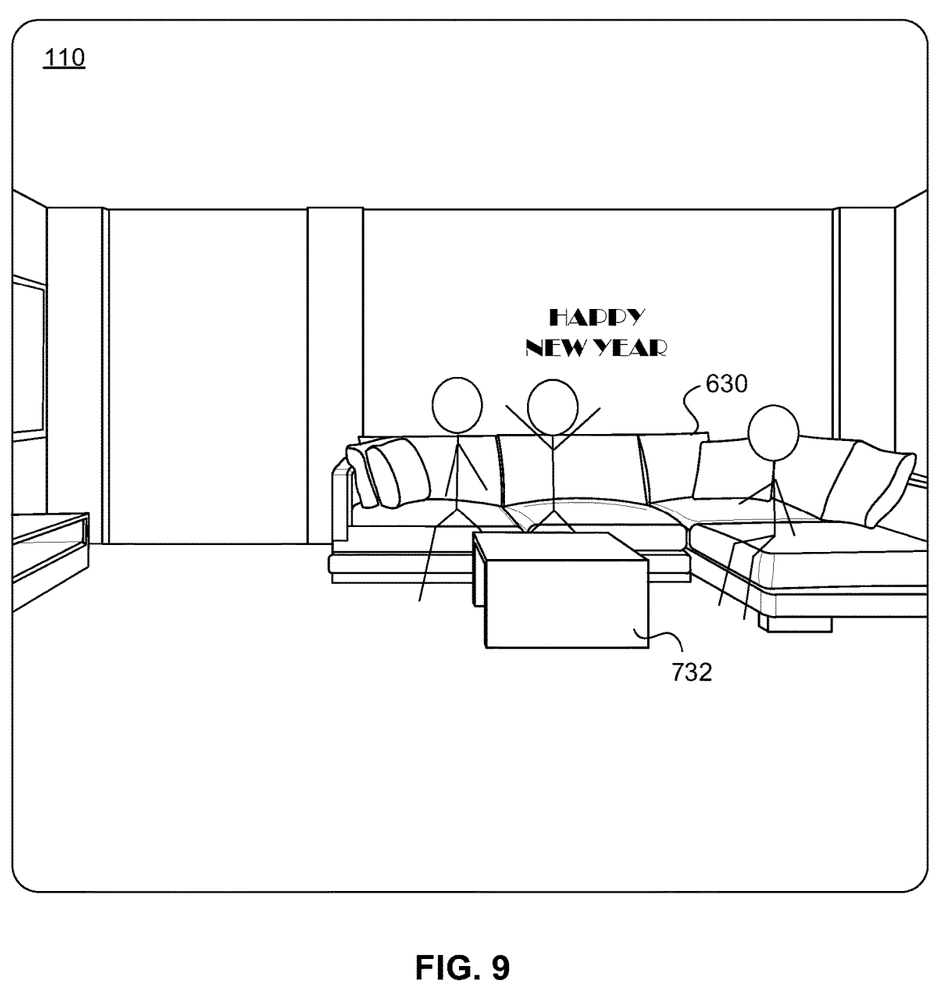
FIG. 9 illustrates the XR environment provided following a selection of a time-anchored virtual content item in the XR environment viewing in FIG. 8, in accordance with some implementations.

FIG. 9 illustrates the XR environment provided following a selection of a time-anchored virtual content item in the XR environment viewing in FIG. 8. In particular, based on a selection of representation 810 in FIG. 8, the view of the XR environment illustrated in FIG. 9 shows the associated New Year's eve virtual content items.

Figure 10:
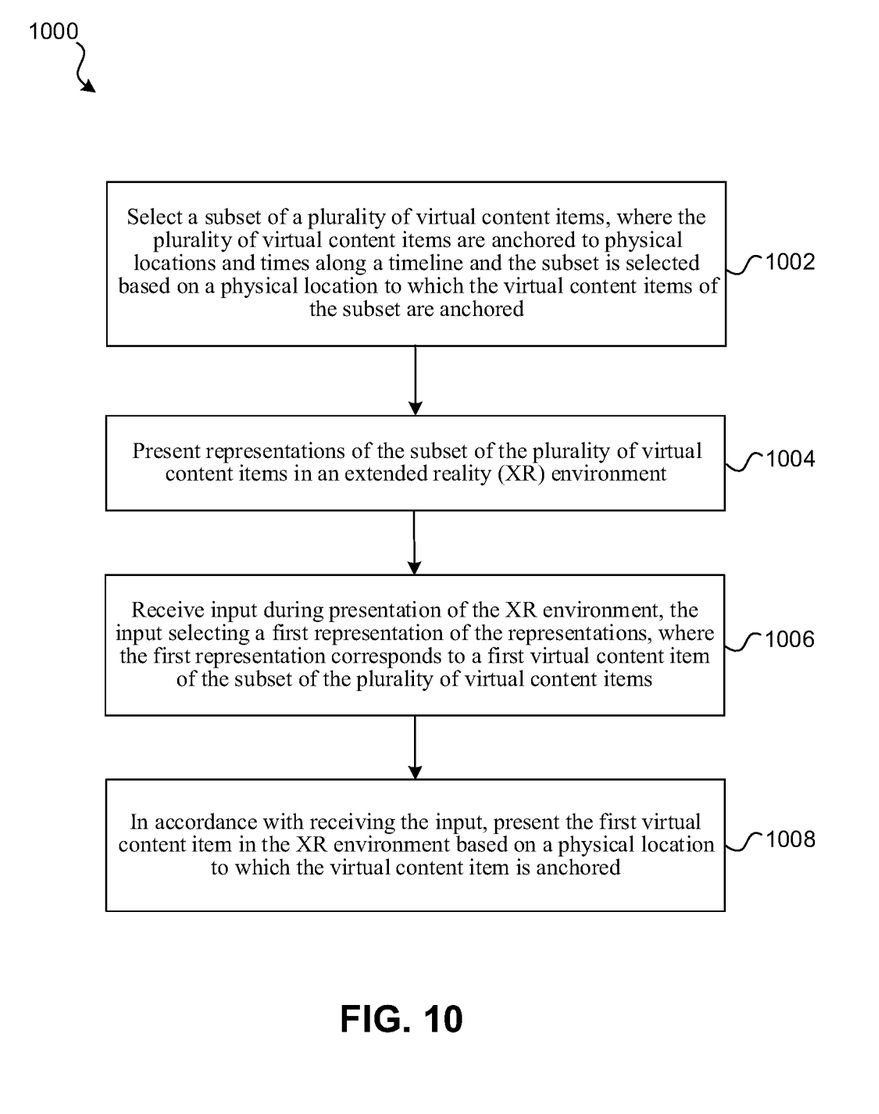
FIG. 10 is a flowchart illustrating a method for providing representations of available time-anchored virtual content items that a user can interact with to select and view a particular content item in accordance with some implementations.

FIG. 10 is a flowchart illustrating a method 1000 for providing representations representing available time-anchored virtual content items that a user can interact with to select and view a particular content item in accordance with some implementations. In some implementations, a device such as electronic device 110 performs method 1000. In some implementations, method 1000 is performed on a mobile device, desktop, laptop, HMD, ear-mounted device or server device. The method 1000 is performed by processing logic, including hardware, firmware, software, or a combination thereof. In some implementations, the method 1000 is performed on a processor executing code stored in a non-transitory computer-readable medium (e.g., a memory).

At block 1002, the method 1000 selects a subset of a plurality of virtual content items, where the plurality of virtual content items are anchored to physical locations and times along a timeline and the subset is selected based on a physical location to which the virtual content items of the subset are anchored. For example, this may involve all of the virtual content items representing memories that are anchored in the user's current physical environment or a selected room/physical environment.

At block 1004, the method 1000 presents representations (e.g., bubbles as illustrated in FIG. 8) of the subset of the plurality of virtual content items in an extended reality (XR) environment. The representations may be presented in an order or spatial arrangement, e.g., chronologically based on the times to which the virtual content represented by each representation is anchored. The representations may provide portal-type views into 3D content and/or to moving content to enable the viewer to better recognize and/or comprehend the nature of the represented virtual content items.

At block 1006, the method 1000 receives input during presentation of the XR environment, the input selecting a first representation of the representations, where the first representation corresponds to a first virtual content item of the plurality of virtual content items. The input may include a gesture, user movement, voice, motion, device, based-input, or any other form of input. For example, the input may be a user pointing to a bubble, turning or moving towards a bubble, providing an audible selection, etc.

At block 1008, in accordance with receiving the input, the method 1000 presents the first virtual content item in the XR environment based on a physical location to which the virtual content item is anchored. For example, as illustrated in FIGS. 6-9, based on the user selecting a representation 810, virtual content associated with the representation 810 is presented within the XR environment, e.g., the representations are users are positioned within the environment in the same positions at which they were when the event originally occurred. The virtual content item may have been created based on images captured from a first viewing position and the XR environment may provide a view of the virtual content item from the same or a different viewing position. In some implementations, multiple virtual content items anchored to the selected time are presented simultaneously, for example, providing virtual content associated with representations 810, 820 simultaneously.

Figure 11:
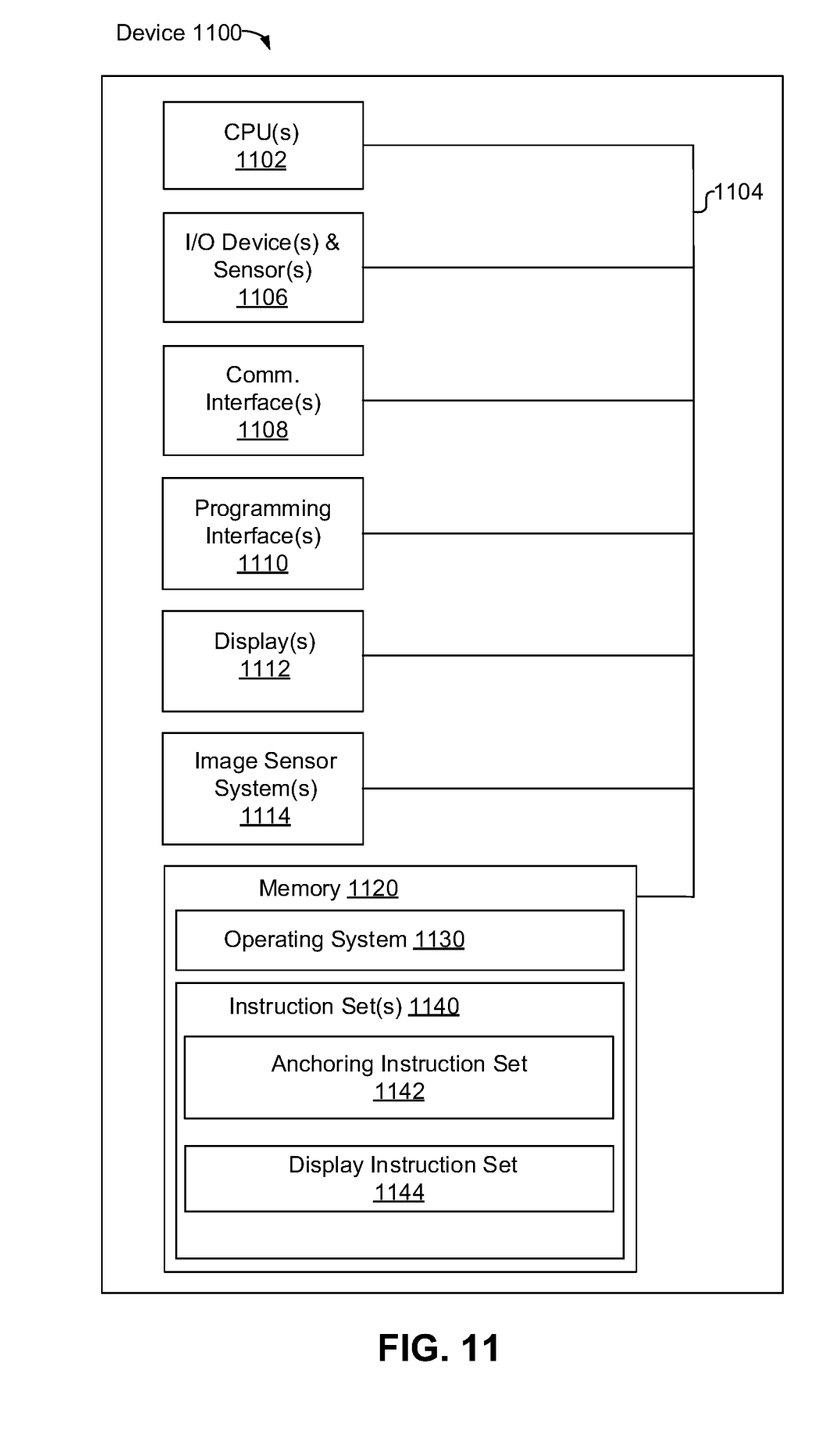
FIG. 11 is a block diagram of an electronic device of in accordance with some implementations.

FIG. 11 is a block diagram of electronic device 1100. Device 1100 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more output device(s) 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1112 include one or more displays configured to present a view of a 3D environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1100 includes a single display. In another example, the device 1100 includes a display for each eye of the user.

In some implementations, the one or more output device(s) 1112 include one or more audio producing devices. In some implementations, the one or more output device(s) 1112 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1112 may additionally or alternatively be configured to generate haptics.

In some implementations, the one or more image sensor systems 1114 are configured to obtain image data that corresponds to at least a portion of a physical environment. For example, the one or more image sensor systems 1114 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include an anchoring instruction set 1142 configured to, upon execution, anchor and/or configure virtual objects with respect to physical environments and times as described herein. The instruction set(s) 1140 further include a display instruction set 1146 configured to, upon execution, display views of physical environments and XR environments as described herein. The instruction set(s) 1140 may be embodied as a single software executable or multiple software executables.

Although the instruction set(s) 1140 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at a device having a processor:
        selecting a subset of a plurality of virtual content items corresponding to a plurality of prior experiences, wherein the plurality of virtual content items are already anchored to physical locations and times of the prior experiences and the subset is selected based on a physical location to which the virtual content items of the subset are anchored;
        presenting representations of the subset of the plurality of virtual content items in an extended reality (XR) environment;
        receiving input during presentation of the XR environment, the input selecting a first representation of the representations, wherein the first representation corresponds to a first virtual content item of the subset of the plurality of virtual content items; and
        in accordance with receiving the input, presenting the first virtual content item in the XR environment based on a physical location to which the virtual content item is anchored.

2. The method of claim 1, wherein selecting the subset comprises selecting all virtual content items anchored to a particular room.

3. The method of claim 1, wherein the input comprises a gesture or user movement.

4. The method of claim 1, wherein each of the plurality of virtual content items is anchored to a particular date or date range.

5. The method of claim 1, wherein the first virtual content item was created based on images captured from a first viewing position and the XR environment provides a view of the first virtual content item from a second viewing position different than the first viewing position.

6. The method of claim 1, wherein the representations of the subset of the plurality of virtual content items are presented concurrently.

7. The method of claim 1, wherein the physical location used to select the subset of the plurality of virtual objects is determined based on a location of the device.

8. The method of claim 1, wherein the first virtual content item comprises a 3D model generated based on sensor data obtained at the physical location at the particular time.

9. The method of claim 1, wherein displaying the first virtual content item is different than presenting a representation of the virtual content item.

10. The method of claim 1 further comprising, in accordance with receiving the input, discontinuing presenting of the representations of the subset of the plurality of virtual content item.

11. The method of claim 1, wherein:
    presenting the representations of the subset of the plurality of virtual content items presents at least some of the virtual content corresponding to each of the representations of the subset of the plurality of virtual content item in respective regions separated from other content within the XR environment; and
    displaying the first virtual content item comprises displaying the virtual content item integrated with the other content within the XR environment.

12. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the system to perform operations comprising:

selecting a subset of a plurality of virtual content items corresponding to a plurality of prior experiences, wherein the plurality of virtual content items are already anchored to physical locations and times of the prior experiences and the subset is selected based on a physical location to which the virtual content items of the subset are anchored;

presenting representations of the subset of the plurality of virtual content items in an extended reality (XR) environment;

receiving input during presentation of the XR environment, the input selecting a first representation of the representations, wherein the first representation corresponds to a first virtual content item of the subset of the plurality of virtual content items; and in accordance with receiving the input, presenting the first virtual content item in the XR environment based on a physical location to which the virtual content item is anchored.

13. The system of claim 12, wherein selecting the subset comprises selecting all virtual content items anchored to a particular room.

14. The system of claim 12, wherein the input comprises a gesture or user movement.

15. The system of claim 12, wherein each of the plurality of virtual content items is anchored to a particular date or date range.

16. The system of claim 12, wherein the first virtual content item was created based on images captured from a first viewing position and the XR environment provides a view of the first virtual content item from a second viewing position different than the first viewing position.

17. The system of claim 12, wherein the representations of the subset of the plurality of virtual content items are presented concurrently.

18. The system of claim 12, wherein the physical location used to select the subset of the plurality of virtual objects is determined based on a location of the device.

19. The system of claim 12, wherein the first virtual content item comprises a 3D model generated based on sensor data obtained at the physical location at the particular time.

20. A non-transitory computer-readable storage medium storing program instructions executable via one or more processors to perform operations comprising:

selecting a subset of a plurality of virtual content items corresponding to a plurality of prior experiences, wherein the plurality of virtual content items are already anchored to physical locations and times of the prior experiences and the subset is selected based on a physical location to which the virtual content items of the subset are anchored;

presenting representations of the subset of the plurality of virtual content items in an extended reality (XR) environment;

receiving input during presentation of the XR environment, the input selecting a first representation of the representations, wherein the first representation corresponds to a first virtual content item of the subset of the plurality of virtual content items; and in accordance with receiving the input, presenting the first virtual content item in the XR environment based on a physical location to which the virtual content item is anchored.

21. The non-transitory computer-readable storage medium of claim 20, wherein selecting the subset comprises selecting all virtual content items anchored to a particular room.

22. The non-transitory computer-readable storage medium of claim 20, wherein the input comprises a gesture or user movement.

23. The non-transitory computer-readable storage medium of claim 20, wherein each of the plurality of virtual content items is anchored to a particular date or date range.

24. The non-transitory computer-readable storage medium of claim 20, wherein the first virtual content item was created based on images captured from a first viewing position and the XR environment provides a view of the first virtual content item from a second viewing position different than the first viewing position.

25. The non-transitory computer-readable storage medium of claim 20, wherein the representations of the subset of the plurality of virtual content items are presented concurrently.

26. The non-transitory computer-readable storage medium of claim 20, wherein the physical location used to select the subset of the plurality of virtual objects is determined based on a location of the device.

27. The non-transitory computer-readable storage medium of claim 20, wherein the first virtual content item comprises a 3D model generated based on sensor data obtained at the physical location at the particular time.

* * * * *